United States Patent [19]

Gaggar

[11] Patent Number: 5,182,338

[45] Date of Patent: Jan. 26, 1993

[54] POLYMER BLEND COMPOSITIONS

[75] Inventor: Satish K. Gaggar, Parkersburg, W. Va.

[73] Assignee: General Electric Company, New York, N.Y.

[21] Appl. No.: 796,930

[22] Filed: Nov. 22, 1991

Related U.S. Application Data

[63] Continuation of Ser. No. 437,711, Nov. 17, 1989, abandoned.

[51] Int. Cl.$^5$ ............... C08L 23/12; C08L 23/02; C08L 71/03
[52] U.S. Cl. .................... 525/187; 524/366; 524/910
[58] Field of Search ............. 525/187; 524/366, 910

[56]     References Cited
U.S. PATENT DOCUMENTS

| | | | |
|---|---|---|---|
| 3,425,981 | 2/1969 | Puletti | 525/187 |
| 3,450,794 | 6/1969 | Ebneth et al. | 525/86 |
| 4,315,081 | 2/1982 | Kobayashi et al. | 525/81 |
| 4,543,390 | 9/1985 | Tanaka et al. | 525/187 |
| 4,588,773 | 5/1986 | Federl et al. | 525/187 |
| 4,624,989 | 11/1986 | Berta | 525/187 |
| 4,719,263 | 1/1988 | Barnhouse et al. | 525/187 |
| 4,775,716 | 10/1988 | Kipouras et al. | 525/187 |
| 4,822,838 | 4/1989 | Watanabe | 525/187 |
| 4,857,590 | 8/1989 | Gaggar et al. | 525/187 |
| 5,023,036 | 6/1991 | Lee | 525/187 |

FOREIGN PATENT DOCUMENTS 004612 2/1973 Japan .

*Primary Examiner*—David J. Buttner
*Attorney, Agent, or Firm*—Lowe, Price, LeBlanc & Becker

[57]     ABSTRACT

The present invention is directed to the use of an epihalohydrin/ethylene oxide copolymer to impart antistatic properties to polyolefins, such as polypropylene.

2 Claims, No Drawings

POLYMER BLEND COMPOSITIONS

This application is a continuation; application of application Ser. No. 07/437,711, filed Nov. 17, 1989, now abandoned.

BACKGROUND OF THE INVENTION

1. FIELD

Polymers having electrostatic dissipative properties.

2. PRIOR ART

This invention is an improvement on the inventions described and claimed in U.S. Pat. Nos. 4,588,773 (Federl et al I) and 4,775,716 (Federl et al II) and U.S. patent application Ser. No. 59,178, filed Jun. 8, 1987 (Gaggar et al), now U.S. Pat. No. 4,857,590, all of which are assigned to the predecessor of the present application's assignee.

Federl et al I relates to the use of an ABS graft copolymer containing a copolymer of epichlorohydrin and an oxirane composition, ethylene oxide. Federl et al II, a continuation-in-part of Federl et al I, also concerns an antistatic graft ABS, but contains smaller amounts of an epichlorohydrin/oxirane copolymer having a somewhat higher ratio of ethylene oxide to epichlorohydrin in said copolymer. U.S. patent application Ser. No. 59,178 (Gaggar et al) is directed to the use of an alkyl methacrylate polymer to compatibilize the antistatic composition with the ABS polymer.

Barnhouse et al, U.S. Pat. No.4,719,263, discloses that the antistatic properties of various polymers, including polyvinyl chloride (PVC), may be improved by adding a copolymer of epichlorohydrin and ethylene oxide. This reference, however, makes no mention of the use of such antistatic agents for polyolefins, such as polypropylene.

SUMMARY OF THE INVENTION

The present invention is directed to the use of an epihalohydrin/ethylene oxide copolymer to impart antistatic properties to polyolefins, such as polypropylene. The need for thermoplastic molding compositions which rapidly dissipate a static charge has grown substantially in recent years. It is reliably estimated that static electricity costs industry millions of dollars in expensive repair and replacement of sensitive electronic components alone. Major applications for such material include tote boxes for the storage of computer chips and other electronic components, xerographic copier parts and communications equipment. Static electricity is also a major hazard where explosive materials are present.

Static electricity is very expensive to control in polymeric materials. Until the invention of Federl I, thermoplastics were generally rendered at least partially antistatic by the incorporation of conductive materials into the resin, such as carbon black particles, or carbon (or metallic) fibers. The literature is replete with attempts to render polymers antistatic all of which have met with less than successful results.

Polyolefins, primarily polyethylene and polypropylene, constitute one of the largest classes of thermoplastics manufactured. Major uses include fibers and film, and injection and blow molded parts for a wide variety of products, such as automobile components and food packaging materials. Its versatility makes it one of the highest volume commodity resins manufactured worldwide. Most isotactic polypropylene is made by the polymerizing propylene with organo-metallic stereospecific catalysts (Ziegler-Natta). As used herein, the term "polyolefin" includes homopolymers and copolymers of both ethylene and propylene, as well as impact modified versions thereof.

The antistatic agent, which constitutes 5-20 wt% of the blend, is a copolymer of an epihalohydrin, preferably epichlorohydrin, and an alkylene oxide, preferably ethylene oxide. Epihalohydrin monomers have the formula:

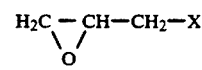

Wherein X is chlorine, bromine or iodine. Preferably X is chlorine, i.e. epichlorohydrin.

The epihalohydrin may be copolymerized with any of a variety of other known, copolymerizable monomers which have an oxirane group. Such monomers include glycidyl ethers, monoepoxides of dienes and polyenes, glycidyl esters and alkalene oxides. Examples of such monomers include vinyl glycidyl ether, isopropenyl glycidyl ether, butadiene monoxide, chloroprene monoxide, 3,4-epoxy-1-pentene, glycidyl acrylate, glycidyl methacrylate, 1,2-epoxy-3,3,trichloropropane, phenyl glycidyl ether, ethylene oxide, propylene oxide and trichlorobutylene oxide.

Preferably the monomer is an alkylene oxide such as ethylene oxide, propylene oxide, butylene oxide, 3,4-epoxy-1-pentene, 1,2-epoxy-3,3,3-trichloropropane. trichlorobutylene oxide and the like. Ethylene oxide is most preferred.

In the preferred embodiment, epichlorohydrin and ethylene oxide are copolymerized to form the antistatic additive. Preferably the epichlorohydrin and ethyline oxide monomers are employed in a weight ratio of from about 15:85 to about 40:60. Materials of this type are made commercially by B. F. Goodrich under the trademarks HYDRIN and STATRITE.

DETAILED DESCRIPTION OF THE INVENTION

The invention can best be understood by referring to a specific example of the compositions generally described above. A blend was prepared 82.5 wt% polypropylene resin with 17.5 wt% of an antistatic copolymer (ASC) containing approximately 20% epichlorohydrin and 80% ethylene oxide. The two components were mixed using a single screw extruder at a melt temperature of about 425° F.

The melt mixed blend was then injection molded into plaques for testing the electrostatic dissipative properties as described in more detail below. Similarly, test plaques were also molded from the same polypropylene without the ASC for comparing the antistatic properties.

Plaques prepared in accordance with the foregoing example were tested for electrostative dissipative properties using Federal Test Standard 101B which is incorporated herein by reference. The results are set forth in Table I:

TABLE I

| Example | A (Control) | B (PP + ASC) |
|---|---|---|
| Surface Resistivity - Ohms | $3.87 \times 10^{15}$ | $2.99 \times 10^{13}$ |
| Volume Resistivity - Ohms-cm | $1.84 \times 10^{15}$ | $7.11 \times 10^{13}$ |
| Static Decay Rate Seconds 1 Day R.H. < 15% | | |

TABLE I-continued

| Example | A (Control) | B (PP + ASC) |
|---|---|---|
| 10% Cut Off | Run On | 0.06 |
| 0% Cut Off | Run On | 0.54 |
| Izod Impact R.T. Ft-lb/in | 0.9 | 2.7 |
| Tensile Yield Stress, psi | 4665 | 3945 |
| Modulus, $10^5$ psi | 2.7 | 2.7 |
| Elongation % | >190 | >190 |

The foregoing data clearly indicates superior electostatic dissipative properties when the epichlorohydrin-/ethylene oxide copolymer is added to the polyolefin as well as unexpected impact strength improvement. The notation "Run On" shows that the static build-up did not diminish in any significant manner during the test.

While this invention has been described in connection with a certain specific embodiment, it will be obvious to those skilled in the art that other combinations may be used. Accordingly the scope of the invention should be determined solely by the appended claims.

What is claimed is:

1. A polymer blend composition, comprising 5 to 20 weight percent of an antistatic agent and 80 to 95 weight percent of a polyolefin polymer, said antistatic agent comprising a copolymer of epihalohydrin and alkylene oxide in a weight ratio of from about 15:85 to about 40:60.

2. A polymer blend composition as defined by claim 1, wherein the antistatic agent comprises a copolymer of epichlorohydrin and ethylene oxide.

* * * * *